United States Patent Office 2,877,095
Patented Mar. 10, 1959

2,877,095

PREPARATION OF MAGNESIUM FLUORIDE

Raymond J. Anderson, Midland, Mich., assignor to The Dow Chemical Company, Midland, Mich., a corporation of Delaware No Drawing. Application January 7, 1957
Serial No. 632,663

3 Claims. (Cl. 23—88)

This invention relates to the production of a filterable magnesium fluoride, and more particularly, to an improved process for the production of an easily filterable magnesium fluoride by the reaction of magnesium chloride and calcium fluoride.

A preparation of magnesium fluoride by the reaction of magnesium chloride and calcium fluoride is described in British Patent No. 546,751. In this process, a 50 percent magnesium chloride solution is reacted with calcium fluoride at a temperature in the range of 120 to 130° C. In following the process of the British patent, the magnesium fluoride obtained is in the form of a gel which is very difficult to recover by filtration or other mechanical means and is practically impossible to wash free of chloride. While the difficulty of the recovery of a gelatinous magnesium fluoride may not be a real problem in a small laboratory operation, it makes the adoption of the process on a commercial scale impractical.

It is, therefore, a principal object of this invention to provide an improved process for the reaction of magnesium chloride and calcium fluoride to prepare a filterable and washable magnesium fluoride. Another object is to provide a process for preparation of a crystalline magnesium fluoride which can be readily washed substantially free of chloride. Other objects will become apparent hereinafter.

The above and additional objects may be accomplished by intermixing calcium fluoride with an aqueous solution of magnesium chloride containing from 30 to 42 weight percent of magnesium chloride and reacting the mixture at a temperature in the range of 150° to 190° C. and under sufficient pressure to maintain the mixture in liquid phase. The magnesium fluoride product obtained is in a crystalline form which can be easily separated from the reaction mixture and readily washed substantially free of chloride.

It has been discovered that to obtain a filterable form of magnesium fluoride by the reaction of calcium fluoride with magnesium chloride, the concentration of the magnesium chloride solution reacted with the calcium chloride must be in the range of 30 to 42 weight percent of magnesium chloride, preferably 35 weight percent. Also, a reaction temperature in the range of 150° to 190° C., preferably 180° C., must be employed. Under the above conditions the magnesium fluoride obtained will have a settling rate of around 6 inches per hour and a ¼ inch filter cake containing about 60 weight percent of solids may be obtained in one minute.

The reaction may be readily carried out by the use of a pressure reactor. The calcium fluoride, ground to a fine particle size, and the magnesium chloride solution are replaced in the reactor equipped with an agitator and reacted at the required temperature. A stoichiometric excess of magnesium chloride in the range of 40 to 60 percent, preferably around 50 percent, is generally employed. The excess of magnesium chloride does not affect the structure of the magnesium fluoride obtained, but only increases the conversion of the calcium fluoride realized.

Since the reaction temperature is in the range of 150° to 190° C. and the reactants are in an aqueous medium, sufficient pressure must be used to keep the reaction mixture in liquid phase. The particular pressure used will vary with the concentration of the magnesium chloride solution employed and is generally in the range of 40 to 80 lbs. per square inch gauge.

The reaction time required to substantially complete the reaction will depend upon the particle size of the calcium fluoride. A better contact between the reactants is obtained with finer particles and the reaction will be completed in less time than with coarse particles. With a calcium fluoride particle size finer than 100 mesh, U. S. sieve series, a reaction time of around 1 to 5 hours is sufficient to substantially complete the reaction.

Although the reacted mixture may be filtered directly after completion of the reaction, it is preferred to dilute the reacted mixture with water in an amount equal to one to three times the volume of the reacted products and thereafter to allow the mixture to settle, usually six to twelve hours. By diluting the reacted mixture and allowing it to settle, magnesium fluoride is concentrated and thus may be more quickly filtered.

The following example further illustrates the invention but is not to be construed as limiting the invention thereto.

*Example 1*

A sample of fluorspar containing 96.02 weight percent of calcium fluoride, 1.43 weight percent of silica, 0.07 weight percent of iron oxide, and the remainder calcite was used as a source of calcium fluoride. The U. S. sieve series screen analysis of the fluorspar is given below:

| Mesh | Weight Percent of Fluorspar Retained on Screen |
|---|---|
| +60 | 0 |
| −60 +100 | 1.25 |
| −100 +150 | 4.37 |
| −150 +200 | 9.26 |
| −200 | 85.1 |

The reaction was carried out in a 2½ gallon steel reactor equipped with a steam jacket and a 5 inch diameter, 6 blade, turbo-mixer type agitator. This reactor was charged with 5000 grams of a 35 weight percent magnesium chloride solution and 982 grams of fluorspar. The agitator was started and the reactor heated to 178° C. After a three hour reaction time, the reacted mixture was removed and diluted with twice its volume of water. The diluted mixture was allowed to settle for 12 hours, the liquid decanted, and the thickened portion filtered. The resulting filtered cake was thereafter washed and dried.

The calcium chloride and the magnesium chloride content of the filtrate was determined and it was found that 66.8 percent of the magnesium chloride had reacted. The dried cake of magnesium fluoride was analyzed and found to contain 98.4 weight percent of magnesium fluoride, 1.5 percent calcium fluoride, and a chlorine content of only 0.05 weight percent.

To show the effect of the concentration of magnesium chloride solution and reaction temperature on the form of magnesium fluoride obtained, a run was made using a solution containing 48 weight percent of magnesium chloride.

Seventy-eight grams of fluorspar having the analysis given above and 298 grams of a magnesium chloride solution containing 48 weight percent of magnesium chloride were added to a reactor. The reactants were heated to 120° C. and maintained at this temperature for two hours. The reacted mixture was diluted with 60 ml. of water and upon filtration required 1 hour to obtain a ¼ inch filter cake. The cake obtained was repulped with 200 ml. of water which again required 1 hour to obtain a ¼ inch cake. The product was gelatinous resembling petroleum jelly and could not be washed. Analysis of the product after repulping with 200 ml. of water indicated that it contained 6.83 weight percent chlorine. Attempts to reduce the chlorine content further by repulping and settling were unsuccessful. After further repulping the cake with 160 ml. of water, no settling was obtained upon allowing the slurry to stand for 72 hours.

Analysis of the filtrate indicated that 85 percent of the calcium fluoride had been converted to magnesium fluoride.

What is claimed is:

1. A process for the preparation of magnesium fluoride in a filterable form, which comprises intermixing finely ground calcium fluoride with an aqueous magnesium chloride solution containing from 30 ot 42 weight percent magnesium chloride, heating, to a temperature in the range of 150° to 190° C., the resulting mixture under sufficient pressure to maintain the mixture in liquid phase to react the calcium fluoride with the magnesium chloride, and separating the magnesium fluoride thus formed.

2. A process for the preparation of magnesium fluoride in a filterable form, which comprises intermixing finely ground calcium fluoride with a 40 to 60 percent stoichiometric excess of an aqueous magnesium chloride solution containing 35 weight percent of magnesium chloride, heating, to a temperature in the range of 150° to 190° C., the resulting mixture under sufficient pressure to maintain the mixture in liquid phase to thereby react the calcium fluoride with the magnesium chloride, and recovering the magnesium thus formed.

3. A process for the preparation of magnesium fluoride in a filterable form, which comprises intermixing finely ground calcium fluoride with a 50 percent stoichiometric excess of an aqueous magnesium chloride solution containing 35 weight percent of magnesium chloride, heating at 180° C. the resulting mixture under sufficient pressure to maintain the mixture in a liquid phase thereby to react the calcium fluoride with the magnesium chloride, and recovering the magnesium fluoride formed.

References Cited in the file of this patent

FOREIGN PATENTS

| 41,717 | Germany | Nov. 16, 1887 |
| 546,751 | Great Britain | July 29, 1942 |

UNITED STATES PATENT OFFICE
CERTIFICATE OF CORRECTION

Patent No. 2,877,095

March 10, 1959

Raymond J. Anderson

It is hereby certified that error appears in the printed specification of the above numbered patent requiring correction and that the said Letters Patent should read as corrected below.

Column 4, line 10, after "magnesium" insert -- fluoride --.

Signed and sealed this 22nd day of September 1959.

(SEAL)
Attest:

KARL H. AXLINE
Attesting Officer

ROBERT C. WATSON
Commissioner of Patents